(12) United States Patent
Wen et al.

(10) Patent No.: US 11,488,294 B2
(45) Date of Patent: **\*Nov. 1, 2022**

(54) METHOD FOR DETECTING DISPLAY SCREEN QUALITY, APPARATUS, ELECTRONIC DEVICE AND STORAGE MEDIUM

(71) Applicant: Beijing Baidu Netcom Science Technology Co., Ltd., Beijing (CN)

(72) Inventors: Yawei Wen, Beijing (CN); Jiabing Leng, Beijing (CN); Minghao Liu, Beijing (CN); Yulin Xu, Beijing (CN); Jiangliang Guo, Beijing (CN); Xu Li, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 227 days.

This patent is subject to a terminal disclaimer.

(21) Appl. No.: 16/939,277

(22) Filed: Jul. 27, 2020

(65) Prior Publication Data

US 2020/0357109 A1 Nov. 12, 2020

Related U.S. Application Data

(63) Continuation of application No. PCT/CN2019/083164, filed on Apr. 18, 2019.

(30) Foreign Application Priority Data

Jul. 2, 2018 (CN) .......................... 201810710537.5

(51) Int. Cl.
*G02F 1/13* (2006.01)
*G06N 3/08* (2006.01)
*G06T 7/00* (2017.01)

(52) U.S. Cl.
CPC .......... *G06T 7/0002* (2013.01); *G02F 1/1309* (2013.01); *G06N 3/08* (2013.01)

(58) Field of Classification Search
CPC ...... G02F 1/1309; G06N 3/0454; G06N 3/08; G06T 2207/20084; G06T 2207/30121; G06T 7/0002; G06T 7/0004
See application file for complete search history.

(56) References Cited

U.S. PATENT DOCUMENTS

2005/0057593 A1\* 3/2005 Kachi .................. H04N 1/2323
347/14
2009/0219521 A1 9/2009 Shin
(Continued)

FOREIGN PATENT DOCUMENTS

CN 102854194 A 1/2013
CN 103913468 A 7/2014
(Continued)

OTHER PUBLICATIONS

Jie Lei ( NPL Doc: "Scale insensitive and focus driven mobile screen defect detection in industry," Mar. 17, 2018, Neurocomputing 294 (2018), www.elsevier.com/locate/neucom, pp. 72-80.).\*
(Continued)

*Primary Examiner* — Omar S Ismail
(74) *Attorney, Agent, or Firm* — Dilworth IP, LLC

(57) ABSTRACT

Provided are a method for detecting display screen quality, an apparatus, an electronic device and a storage medium. The method includes: receiving a quality detection request sent by a console deployed on a display screen production line, the quality detection request including a display screen image collected by an image collecting device on the display screen production line; inputting the display screen image into a defect detection model to obtain a defect detection result, the defect detection model being obtained by training historical defective display screen images using a structure (Continued)

of deep convolutional neural networks and an object detection algorithm; and determining, according to the defect detection result, a defect on a display screen corresponding to the display screen image, a defect category corresponding to the defect, and a position corresponding to the defect.

18 Claims, 4 Drawing Sheets

(56) References Cited

U.S. PATENT DOCUMENTS

| | | | |
|---|---|---|---|
| 2015/0168293 | A1 | 6/2015 | Baker |
| 2017/0323376 | A1 | 11/2017 | Glaser et al. |
| 2018/0107928 | A1 | 4/2018 | Zhang et al. |
| 2018/0204069 | A1* | 7/2018 | Yano ................ H04N 7/181 |
| 2018/0211374 | A1* | 7/2018 | Tanaka ............... G06T 7/0004 |
| 2018/0268256 | A1* | 9/2018 | Di Febbo ............ G06T 7/001 |
| 2018/0322623 | A1* | 11/2018 | Memo ................. G06T 7/0004 |
| 2018/0342050 | A1* | 11/2018 | Fitzgerald ........... H04N 5/2628 |
| 2019/0188846 | A1* | 6/2019 | Tamai ................. G06K 9/6254 |
| 2019/0340541 | A1* | 11/2019 | Watson ............... G06N 3/0454 |

FOREIGN PATENT DOCUMENTS

| | | |
|---|---|---|
| CN | 105044127 A | 11/2015 |
| CN | 106228532 A | 12/2016 |
| CN | 106952250 A | 7/2017 |
| CN | 107292870 A | 10/2017 |
| CN | 107561738 A | 1/2018 |
| CN | 107944551 A | 4/2018 |
| CN | 108108768 A | 6/2018 |
| CN | 108154504 A | 6/2018 |
| CN | 108230317 A | 6/2018 |
| CN | 108230318 A | 6/2018 |
| CN | 108846841 A | 11/2018 |
| JP | H08247962 A | 9/1996 |
| JP | 2001509618 A | 7/2001 |
| JP | 2003317082 A | 11/2003 |
| JP | 2010159979 A | 7/2010 |
| JP | 2012032369 A | 2/2012 |
| JP | 2017524183 A | 8/2017 |
| KR | 101688458 B1 | 12/2016 |
| KR | 20170127269 A | 11/2017 |
| KR | 101838664 B1 | 3/2018 |
| KR | 20200004823 A | 1/2020 |
| KR | 20200004825 A | 1/2020 |

OTHER PUBLICATIONS

Leanne Attard,"Automatic Crack Detection using Mask R-CNN," Oct. 17, 2019, 2019 11th International Symposium on Image and Signal Processing and Analysis (ISPA),pp. 152-154.*

Wuyi Ming,"Defect detection of LGP based on combined classifier with dynamic weights," May 9, 2019,Measurement 143 (2019),www.elsevier.com/locate/measurement,pp. 211-222.*

Zhi Zeng,"LED TV Screen Inspection using Deep Learning toward Machine Vision," Jan. 24, 2019, 2018 Chinese Automation Congress (CAC),pp. 1644-1647.*

Hua Yang,"Multiscale Feature-Clustering-Based Fully Convolutional Autoencoder for Fast Accurate Visual Inspection of Texture Surface Defects," Jan. 1, 2019, IEEE Transactions on Automation Science and Engineering, vol. 16, No. 3, Jul. 2019,pp. 1450-1460.*

Zhi-Chao Yuan,"Vision-Based Defect Detection for Mobile Phone Cover Glass using Deep Neural Networks," Feb. 11, 2018, International Journal of Precision Engineering and Manufacturing vol. 19, No. 6, pp. 801-808.*

Notice of Allowance in KR Patent Application No. 20197034323 dated Feb. 25, 2021.

He, Kaiming et al., Mask R-CNN, arXiv:1703.06870v1, Mar. 20, 2017, pp. 1-9.

Third Office Action in CN Patent Application No. 201810710537.5 dated Jul. 19, 2021.

International Search Report issued in International Application No. PCT/CN2019/083164 dated Jul. 19, 2019.

Written Opinion issued in International Application No. PCT/CN2019/083164 dated Jul. 19, 2019.

First Office Action issued in CN Patent Application No. 201810710537.5 dated May 22, 2020.

First Office Action in JP Patent Application No. 2019563779 dated Oct. 7, 2020.

First Office Action issued in corresponding Korean Patent Application KR20197034323 dated Aug. 24, 2020.

* cited by examiner

METHOD FOR DETECTING DISPLAY SCREEN QUALITY, APPARATUS, ELECTRONIC DEVICE AND STORAGE MEDIUM

CROSS-REFERENCE TO RELATED APPLICATIONS

This application is a continuation of International Application No. PCT/CN2019/083164 filed on Apr. 18, 2019, which claims priority to Chinese Patent Application No. 201810710537.5, filed to China National Intellectual Property Administration on Jul. 2, 2018 with the Applicant being Beijing Baidu Netcom Science Technology Co., Ltd., and entitled "METHOD FOR DETECTING DISPLAY SCREEN QUALITY, APPARATUS, ELECTRONIC DEVICE AND STORAGE MEDIUM". The contents of the above applications are hereby incorporated by reference in their entireties.

TECHNICAL FIELD

The present application relates to the field of computer technologies and, in particular, to a method for detecting display screen quality, an apparatus, an electronic device and a storage medium.

BACKGROUND

As information display technology plays an increasingly important role in our lives, display screens are also widely used because of their characteristics such as small size, light weight, low power, high resolution, high brightness and no geometric deformation. However, in the production process of a display screen, the produced display screen may have display defects due to various reasons, such as point defects, line defects and surface defects and so on. Therefore, the detection of display screen quality is an important link in the production process.

In the prior art, an artificial detection method or a machine-aided artificial detection method is mainly adopted for the detection of display screen quality. Specifically, the artificial detection method refers to giving the judgment by industry experts depending on the observation by their naked eyes on the images collected from the production environment; the machine-aided artificial detection method refers to detecting the display screen images to be detected using a quality detection system solidified with the industry experts' experience firstly, and then detecting and judging, by the industry experts, the images suspected of defects.

However, both the artificial detection method and the machine-aided artificial detection method are prone to be affected by subjective factors from human beings, resulting in low detection accuracy, poor system performance and low service expansion capability.

SUMMARY

The present application provides a method for detecting display screen quality, an apparatus, an electronic device and a storage medium, to overcome the problem that the existing methods for detecting a defect of a display screen are prone to be affected by subjective factors from human beings, resulting in low detection accuracy, poor system performance and low service expansion capability.

A first aspect of the present application provides a method for detecting display screen quality, including:

receiving a quality detection request sent by a console deployed on a display screen production line, the quality detection request including a display screen image collected by an image collecting device on the display screen production line;

inputting the display screen image into a defect detection model to obtain a defect detection result, the defect detection model being obtained by training historical defective display screen images using a structure of deep convolutional neural networks and an object detection algorithm; and determining, according to the defect detection result, a defect on a display screen corresponding to the display screen image, a defect category corresponding to the defect, and a position corresponding to the defect.

In this embodiment, the defect detection model, which is obtained by training the historical defective display screen images based on the structure of deep convolutional neural networks and the object detection algorithm, is used to perform a defect detection on the display screen image, so as to determine the defect on the display screen corresponding to the display screen image, the defect category corresponding to the defect, and the position corresponding to the defect. The defect detection result based on such defect detection model has high accuracy, the intelligentization capability is strong, and the system performance and the service expansion capability are high.

Optionally, the defect detection model being obtained by training historical defective display screen images using a structure of deep convolutional neural networks and an object detection algorithm includes that:

the defect detection model is a result of combined training on a candidate region loss, a region category loss and a region boundary loss of each of the historical defective display screen images, so that a total loss value of the candidate region loss, the region category loss and the region boundary loss satisfies a preset loss threshold;

where the candidate region loss refers to a loss value between a selected defective region in the each of the historical defective display screen images and an actual defective region, the region category loss refers to a loss value between a predicted defect category in the selected defective region and an actual defect category, and the region boundary loss refers to a loss value between a predicted defect boundary in the selected defective region and an actual defect boundary.

In this embodiment, the classification accuracy of the defect detection model obtained by combined training on the candidate region losses, the region category losses and the region boundary losses of the display screen image is high, and the performance of the detection system is improved.

Optionally, before inputting the display screen image into the defect detection model to obtain the defect detection result, the method further includes:

performing image preprocessing on the display screen image, where the image preprocessing includes one or more of the following processes trimming, cutting, rotating, shrinking and enlarging.

Optionally, the inputting the display screen image into the defect detection model to obtain the defect detection result includes:

determining, according to a load balancing strategy, a detection model server for bearing processing resources; and inputting the display screen image into the defect detection model running on the detection model server to obtain the defect detection result.

In this embodiment, the obtained display screen image is preprocessed to make the processed display screen image conform to the detection standard, which lays a foundation for subsequent defect detection in the display screen image and improves the detection accuracy of display screen quality.

Optionally, the method further includes:

determining quality of the display screen corresponding to the display screen image according to production stage information and the defect detection result; the production stage information is used to indicate a manufacturer corresponding to the display screen, a production environment corresponding to the display screen, and a type of the display screen.

In this embodiment, for different kinds of display screens, the production stages are different. When analyzing the defect detection results, the quality of the display screens is determined in combination with the production stage information of respective display screens, which can improve the accuracy of obtaining the display screen quality.

Optionally, after determining the quality of the display screen corresponding to the display screen image according to the production stage information and the defect detection results, the method further includes:

if it is determined that the display screen is a defective display screen, performing one or more of the following operations:

sending, through a controller, alarm information to a production manager;

storing, through the controller, the defect detection result into a production database as a log;

sending, through the controller, a production control instruction to the console to eliminate the defect;

inputting the display screen image and the defect detection result into the defect detection model to optimize the defect detection model.

In the embodiment, after the method for detecting display screen quality is running on the display screen production line for a period of time, the accuracy of the defect detection and the defect location can be rechecked artificially through the information in the production database, then the training database can be updated, and the defect detection model can be retrained to improve the accuracy of defect detection.

A second aspect of the present application provides an apparatus for detecting display screen quality, including:

a receiving module, configured to receive a quality detection request sent by a console deployed on a display screen production line, the quality detection request including a display screen image collected by an image collecting device on the display screen production line;

a processing module, configured to input the display screen image into a defect detection model to obtain a defect detection result, the defect detection model being obtained by training historical defective display screen images using a structure of deep convolutional neural networks and an object detection algorithm; and a determining module, configured to determine, according to the defect detection result, a defect on a display screen corresponding to the display screen image, a defect category corresponding to the defect, and a position corresponding to the defect.

The technical effect of the apparatus for detecting display screen quality provided by the present application can be exactly the same as that of the above-mentioned method for detecting display screen quality.

Optionally, the defect detection model being obtained by training historical defect display screen images using a structure of deep convolutional neural networks and an object detection algorithm includes that:

the defect detection model is a result of combined training on a candidate region loss, a region category loss and a region boundary loss of each of the historical defective display screen images, so that a total loss value of the candidate region loss, the region category loss and the region boundary loss satisfies a preset loss threshold;

where the candidate region loss refers to a loss value between a selected defective region in the each of the historical defective display screen images and an actual defective region, the region category loss refers to a loss value between a predicted defect category in the selected defective region and an actual defect category, and the region boundary loss refers to a loss between a predicted defect boundary in the selected defective region and an actual defect boundary.

Optionally, the processing module is further configured to perform image preprocessing on the display screen image before inputting the display screen image into the defect detection model to obtain the defect detection result;

where the image preprocessing includes one or more of the following processes:

trimming, cutting, rotating, shrinking and enlarging.

Optionally, the processing module is specifically configured to determine, according to a load balancing strategy, a detection model server for bearing processing resources, and input the display screen image into the defect detection model running on the detection model server to obtain the defect detection result.

Optionally, the determining module is further configured to determine quality of the display screen corresponding to the display screen image according to production stage information and the defect detection result; the production stage information is used to indicate a manufacturer corresponding to the display screen, a production environment corresponding to the display screen, and a type of the display screen.

Optionally, the processing module is further configured to: after the determining module determines the quality of the display screen corresponding to the display screen image according to the defect detection result, if it is determined that the display screen is a defective display screen, perform one or more of the following operations:

sending, through a controller, alarm information to a production manager;

storing, through the controller, the defect detection result into a production database as a log;

sending, through the controller, a production control instruction to the console to eliminate the defect;

inputting the display screen image and the defect detection result into the defect detection model to optimize the defect detection model.

A third aspect of the present application provides an electronic device, including a processor, a memory, and a computer program stored on the memory and running on the processor, when the processor executes the computer program, the method according to any one of the first aspect and the various possible implementations of the first aspect is implemented.

A fourth aspect of the present application provides a storage medium, having instructions stored thereon which, when running on a computer, cause the computer to execute the method according to any one of the first aspect and the various possible implementations of the first aspect.

The present application provides a method for detecting display screen quality, an apparatus, an electronic device and a storage medium. The method includes: receiving a quality detection request sent by a console deployed on a display screen production line, the quality detection request including a display screen image collected by an image collecting device on the display screen production line; inputting the display screen image into a defect detection model to obtain a defect detection result, the defect detection model being obtained by training historical defective display screen images using a structure of deep convolutional neural networks and an object detection algorithm; and determining, according to the defect detection result, a defect on a display screen corresponding to the display screen image, a defect category corresponding to the defect, and a position corresponding to the defect. Using such technical solution, the defect detection accuracy is high, the system performance is good, and the service expansion capability is high.

DESCRIPTION OF EMBODIMENTS

In order to make the purposes, technical solutions and advantages of the present application clearer, the technical solutions in embodiments of the present application will be described clearly and completely in the light of the embodiments of the present application. Obviously, the embodiments described are part of the embodiments of the present application, not all of them. Based on the embodiments in the present application, all other embodiments obtained by those skilled in the art without creative work fall within the protection scope of the present application.

Figures 1, 2:
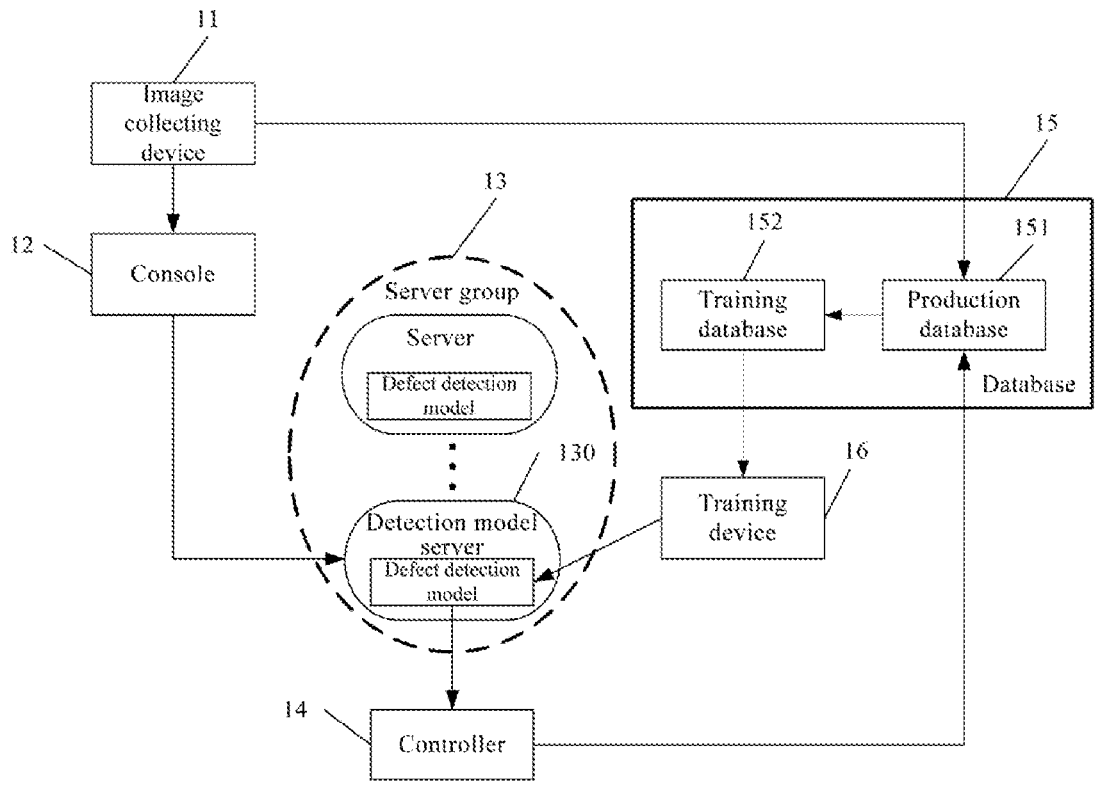
FIG. 1 is a schematic structural diagram of a system for detecting display screen quality provided by an embodiment of the present application.
FIG. 2 is a flowchart of Embodiment 1 of a method for detecting display screen quality provided by an embodiment of the present application.

The method for detecting display screen quality provided by embodiments of the present application is applied in a system for detecting display screen quality. FIG. 1 is a schematic structural diagram of a system for detecting display screen quality provided by an embodiment of the present application. As shown in FIG. 1, the system for detecting display screen quality includes many different devices including an image collecting device 11, a console 12, a server group 13, a controller 14, a database 15 and a training device 16 and so on which are deployed on a display screen production line.

The image collecting device 11 collect a display screen image on the display screen production line. The console 12 receives the display screen image collected by the image collecting device 11, and sends the display screen image to a detection model server 130 in the server group 13. The detection model server 130 inputs the received display screen image into a defect detection model running on the detection model server 130 to obtain a defect detection result. The controller 14 receives the defect detection result of the detection model server 130, and gives a service response based on production stage information. The controller 14 can also store the defect detection result as a log in the database 15. In addition, the display screen image collected by the image collecting device 11 can also be directly stored in the database 15 as original data for training the defect detection model. After extracting historical defective display screen images from the database, the training device 16 trains the historical defective display screen images using a structure of deep convolutional neural networks and an instance segmentation algorithm to obtain the defect detection model.

Optionally, the database 15 can include a production database 151 and a training database 152. The production database 151 can receive and save the defect detection result sent by the controller 14 and the display screen image collected by the image collecting device 11. The training database 152 can store the historical defective display screen images and corresponding original display screen images extracted from the production database 151, so that the training device 16 obtains the defect detection model with high detection accuracy by training.

Optionally, the training device 16 in the embodiments of the present application may be a training engine implemented by hardware and/or software functions, which serves as a training tool for the defect detection model.

The system for detecting display screen quality of the embodiments of the present application may also include other entity modules such as processors, memories, etc., which is not limited in this embodiment.

The following is a brief description of the application scenarios applicable to the embodiments of the present application.

At present, the degree of overall intelligent automation of 3C industry (which refers to the information appliance industry that integrates three major scientific and technological products including computer, communication and consumer electronics) is relatively low. According to the investigation and analysis of the display screen industry such as mobile display screens, it can be concluded that the detection methods adopted by most manufacturers for mobile display screens can be divided into two types: an artificial detection method and a machine-aided artificial detection method.

The artificial detection method refers to giving the judgment by industry experts depending on the observation by their naked eyes on the images collected from the production environment, which is prone to be influenced by subjective factors from human beings, and has low detection efficiency and more damages to human eyes. In addition, because the production workshop for the display screens is generally dust-free, the staff need to prepare to be clean and wear dust-free clothes before entering, which may also have adverse effects on the health and safety of the staff.

The machine-aided artificial detection method can also be called a detection method based on a liquid crystal module detection device. The specific principle is that: firstly, images without defects are filtered out by a quality detection system with certain judgment capability, and then the images suspected of defects are detected and judged by the industry experts. In the machine-aided artificial detection method, quality detection systems are mostly developed from expert systems and feature engineering systems, which means that experts solidify their experience in the quality detection systems and make them have certain automation capability. Therefore, the machine-aided artificial detection method not only has low accuracy, poor system performance and cannot cover all the detection standards of manufacturers, but also has low efficiency and is prone to missed judgments and misjudgments, and it is difficult for the detected image data to be used for secondary mining. In addition, in the above-mentioned quality detection system, the features and decision rules are solidified into the machine based on the experience of industry experts, and it is difficult to be iterated with the development of services, which results in that the detection accuracy of the quality detection system is getting lower and lower, and may even be reduced to a completely unavailable state with the development of production technology. Further, the features of the quality detection system are pre-solidified in hardware by a third-party supplier, the upgrading of which not only requires major transformation of the production line, but also is expensive. There are obvious shortcomings in security, standardization and scalability and so on, which are adverse to the optimization and upgrading of the display screen production line, and result in low service expansion capability.

In summary, both the artificial detection method and the machine-aided artificial detection method have the following shortcomings: not only are they inefficient and prone to misjudgments, but also the industrial data generated by these two methods are not easy for storing, management and secondary mining.

Based on the latest development of artificial intelligence technology in computer vision, embodiments of the present application develop an automatic method for detecting display screen quality with high accuracy. The surface quality of a display screen is detected and judged in real time using a display screen image collected in real time by an image collecting device on a display screen production line; if it is detected that the current display screen on which the image collecting device performs the collection has a quality problem, then the position of the quality problem in the image, the category it belongs to and the category instance are determined.

It is worth noting that the embodiments of the present application can be applied to any scenario where display screen detection can be performed using human eyes and computer vision. The display screen in this embodiment may include any of the following: a plasma screen, a liquid crystal display (LCD) screen, a light emitting diode (LED) screen, an organic light-emitting diode (OLED) screen and so on. The embodiments of the present application are not limited to the above-mentioned screens, but may also include other display screens, which will not be repeated here.

Optionally, the quality problem described in the embodiments of the present application may include, but is not limited to, different categories of defects such as a point defect, a line defect, a surface defect and mura, which will not be introduced one by one here. Optionally, mura refers to a variety of trace phenomena caused by uneven brightness of the display screen.

Next, the technical solutions of the present application are described in detail through specific embodiments. It should be noted that the following specific embodiments can be combined with each other, and the same or similar concepts or processes may not be repeated in some embodiments.

In the embodiments of the present application, "multiple" means two or more. "And/or" describes the association relationship between related objects, indicating that there can be three relationships, for example, A and/or B can represent three cases that: A exists alone, A and B exist at the same time, and B exist alone. The character "/" generally indicates that the relationship between the front and back related objects is an "or" relationship.

FIG. 2 is a flowchart of Embodiment 1 of a method for detecting display screen quality provided by an embodiment of the present application. As shown in FIG. 2, in the embodiments of the present application, the method for detecting display screen quality can include the following steps.

Step 21: receiving a quality detection request sent by a console deployed on a display screen production line, the quality detection request including a display screen image collected by an image collecting device on the display screen production line.

Optionally, in the embodiments of the present application, multiple devices including the image collecting device, the console, a server group, a controller, a database and so on are deployed on the display screen production line. The image collecting device can be a high-precision image collecting camera. In the production process of display screens, multiple display screen images corresponding to the display screens on the display screen production line can be collected by adjusting the angle, light, filter, multiplier, focus of the image collecting device.

After the image collecting device on the display screen production line collects the display screen image, the console deployed on the display screen production line can send the quality detection request to the server group deployed with a defect detection model on the display screen production line. The quality detection request includes the above mentioned display screen image collected by the image collecting device, so that a server in the server group which receives the quality detection request processes the received display screen image.

Step 22: inputting the display screen image into a defect detection model to obtain a defect detection result, the defect detection model being obtained by training historical defective display screen images using a structure of deep convolutional neural networks and an object detection algorithm.

Optionally, the server which receives the quality detection request inputs the display screen image in the quality detection request into the defect detection model running on the server, performs the defect detection by the defect detection model, and then obtains the defect detection result.

It is worth noting that the defect detection model running on the server is obtained by training the historical defective display screen images using the structure of deep convolutional neural networks and the object detection algorithm. That is, display screen images on the display screen production line are used as the input of the defect detection model, and features of the display screen images (i.e., defects in the display screen images) are extracted using the structure of deep convolutional neural networks and the object detection algorithm and used as the output of the defect detection model, and then the training is performed for the defect detection model.

Specifically, object detection means that a machine can automatically determine an object different from other objects at other positions in a display screen and a region border corresponding to the object from the image using a target detection method; the region border refers to the range of the region where the object is located on the display screen. It is worth pointing out that the object detection can distinguish which positions of the display screen are defective, and what specific defect category the defect belongs to. Therefore, in the embodiments of the present application, the defect detection model is obtained by training a large number of historical defective display screen images using the structure of deep convolutional neural networks and the object detection algorithm, that is, first, different defects in the historical defective display screen images are determined; then the defects in the images and the specific categories corresponding to the defects are separated out from the perspective of orientation or region, and are marked in the display screen images; and finally, classification, statistics and combined training are performed thereon to obtain the defect detection model.

As an example, the defect detection model in the embodiments of the present application being obtained by training the historical defective display screen images using the structure of deep convolutional neural networks and the object detection algorithm can be explained as follows:

the defect detection model is a result of combined training on a candidate region loss, a region category loss and a region boundary loss of each of the historical defective display screen images, so that a total loss value of the candidate region loss, the region category loss and the region boundary loss satisfies a preset loss threshold.

A candidate region loss refers to a loss value between a selected defective region in a historical defective display screen image and an actual defective region, a region category loss refers to a loss value between a predicted defect category in the selected defective region and an actual defect category, and a region boundary loss refers to a loss value between a predicted defect boundary in the selected defective region and an actual defect boundary.

In the embodiments of the present application, the defect detection model is based on the structure of Deep Convolutional Neural Networks (Deep CNNs). The structure of deep convolutional neural networks is mainly composed of a convolution layer, a pooling layer and a full connection layer and so on. The granularity and level selection of the deep convolutional neural networks can be determined according to the actual situation, which is not limited in the embodiments of the present application. A convolution operation of the convolution layer refers to the process of scanning and convoluting a display screen image or an image feature map obtained after at least one convolution process using convolution kernels with different weights to extract the features of various categories and get a new image feature map. A convolution kernel is a weight matrix, that is, the weights used in convolution are expressed by a matrix. The matrix has a size same as that of the corresponding image region, the number of rows and the number of columns thereof are odd numbers, and the matrix is a weight matrix. A pooling operation of the pooling layer refers to a dimension reduction operation of the feature map outputted from the convolution layer with the main features in the feature map being retained. In the CNN networks, the full connection layer maps the feature map generated by the convolution layer into a feature vector of fixed length (which is usually the number of image categories in an input image data set). The feature vector contains combination information of all the features of the input image, that is, the most characteristic image features in the image are retained to complete the task of image classification.

In the embodiments of the present application, such deep neural network model with convolution, pooling and full connection operations can be utilized, which has relatively high robustness to the deformation, blurring and illumination changes of the display screen image collected by the image collecting device on the display screen production line, and has higher generalization for the classification task.

Optionally, in this embodiment, the object detection algorithm may adopt a Faster RCNN algorithm. In the Faster RCNN algorithm, the convolution operation of the structure of convolutional neural networks is first used to obtain a feature map thereof, and then whether the selected defect region of the display screen image contains a specific defect is calculated. If the defect is included, on one hand, a loss value (a candidate region loss) between the selected defect region and the actual defect region can be calculated; on the other hand, feature extraction can be carried out using the convolutional neural networks, then the defect category and the defect boundary in the selected defect region can be predicted, and a loss value (a region category loss) between the predicted defect category in the selected defect region and the actual defect category as well as a loss value (a region boundary loss) between the predicted defect boundary in the selected defect region and the actual defect boundary can be calculated. If there is no specific defect in the selected defect region of the display screen image, the classification is not carried out.

Specifically, in this embodiment, the Faster RCNN algorithm can also be combined with a Regional Proposal Network. The Regional Proposal Network is to obtain whether there is a specific object (a defect) in a region of the original image of the display screen image; if there is an object in a region of the original image, compare the original image with the feature map extracted by the Faster RCNN algorithm, and predict the category of the object at the region of the feature map and the position of the region on the display screen.

In summary, the defect detection model is the result of combined training on the candidate region losses, region category losses and region boundary losses of the historical defective display screen images. A loss function including the candidate region loss, region category loss and region boundary loss can be obtained. The loss function is used to evaluate the difference between the output of the deep convolutional neural networks and the actual values in the training stage of the defect detection model. Then the weight values among neurons are updated with the value of the loss function. The training purpose of the deep convolutional neural networks is to minimize the value of the loss function.

When the error value between the output of the defect detection model and the defect results marked in the display screen images is less than a preset loss threshold, the training is stopped. The preset loss threshold refers to a value that meets the service requirement of the display screen.

It is worth noting that in the embodiments of the present application, for different production scenarios and characteristics of display screen images, the depth of the deep convolutional neural networks, the number of neurons in each layer and the organizational mode of the convolution layer and the pooling layer which are required for obtaining the defect detection model by training may be different, and can be determined according to the actual situation, which are not limited in this embodiment.

Step 23: determining, according to the defect detection result, a defect on a display screen corresponding to the display screen image, a defect category corresponding to the defect, and a position corresponding to the defect.

Optionally, in the embodiments of the present application, after the defect detection result is obtained according to the defect detection model, the defect on the display screen corresponding to the display screen image, the defect category corresponding to the defect, and the position corresponding to the defect can be determined according to the defect detection result.

In this embodiment, when there is a defect in the display screen image, the defect detection result obtained by the defect detection model can include the defect category (how many categories of defects existing on the display screen) and the defect position (the specific position of each defect). That is, the defect detection model in the embodiments of the present application can detect the number of defect categories in the display screen image and the specific number of defects in each category.

Figure 3:
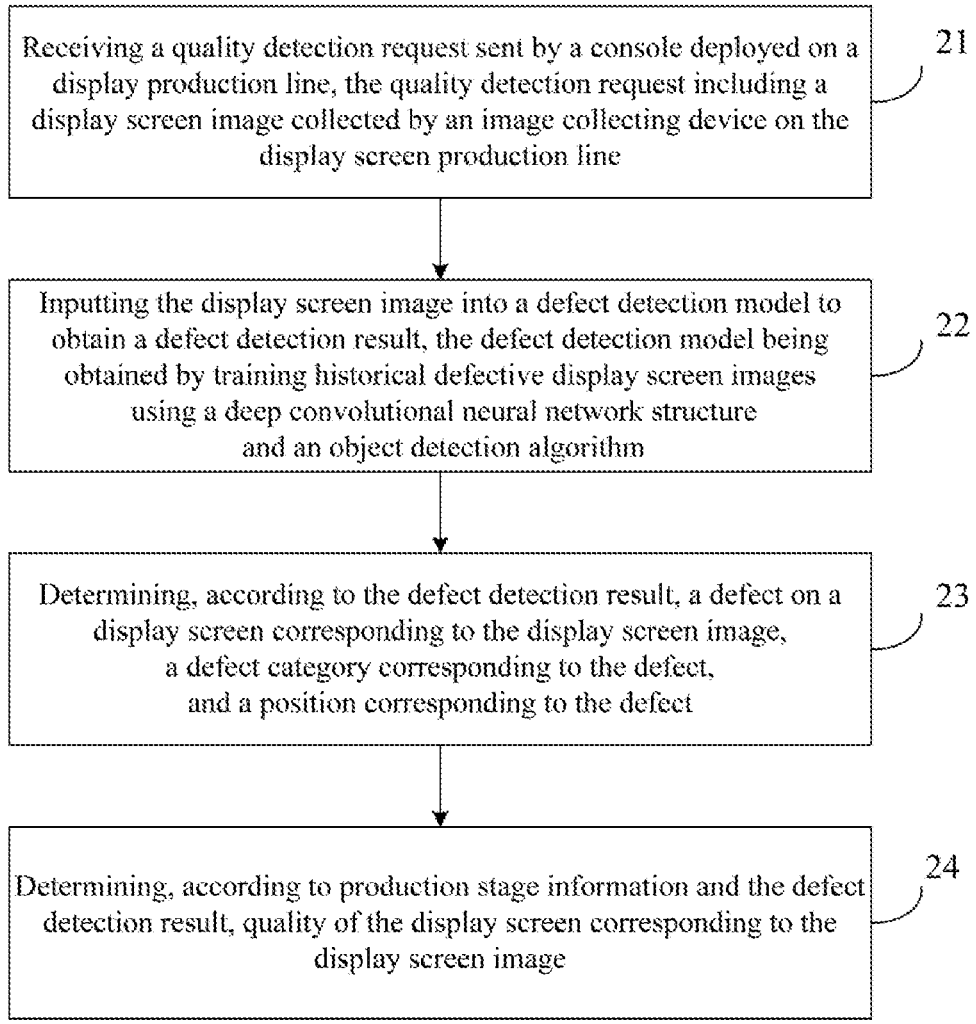
FIG. 3 is a flowchart of Embodiment 2 of a method for detecting display screen quality provided by an embodiment of the present application.

Correspondingly, FIG. 3 is a flowchart of Embodiment 2 of a method for detecting display screen quality provided by an embodiment of the present application. As shown in FIG. 3, in this embodiment, after the step 23 (determining, according to the defect detection result, the defect on the display screen corresponding to the display screen image, the defect category corresponding to the defect, and the position corresponding to the defect), step 24 can also be included:

determining quality of the display screen corresponding to the display screen image according to production stage information and the defect detection result; the production stage information is used to indicate a manufacturer corresponding to the display screen, a production environment corresponding to the display screen, and a type of the display screen.

Specifically, different defect detection results may be obtained in the process of detecting the display screen quality due to various different kinds of production stage information such as different manufacturers of display screens, different production environments of display screens, and different types of display screens. For example, a liquid crystal display (LCD) usually goes through the production stages of thin film transistor processing, color filter processing, unit assembly and module assembly and so on. An LED screen usually goes through the stages of patch, plug-in, wave soldering, backhand-welding, testing, module assembly and so on. For different types of display screens, their production stages are different. Therefore, when analyzing the defect detection result obtained above, it is necessary to combine the production stage information of the display screen to determine the quality of the display screen.

In the method for detecting display screen quality provided by the embodiments of the present application, the quality detection request sent by the console deployed on the display screen production line is received, the quality detection request including the display screen image collected by the image collecting device on the display screen production line; the display screen image is inputted into the defect detection model to obtain the defect detection result; and the defect on the display screen, the defect category corresponding to the defect, and the position corresponding to the defect and/or the quality of the display screen are determined according to the defect detection result. Since the defect detection model is obtained by training the historical defective display screen images using the structure of deep convolutional neural networks and the object detection algorithm, the defect detection result obtained using such defect detection model has high accuracy of classification, the intelligentization capability is strong, and the system performance and the service expansion capability are high.

Figure 4:
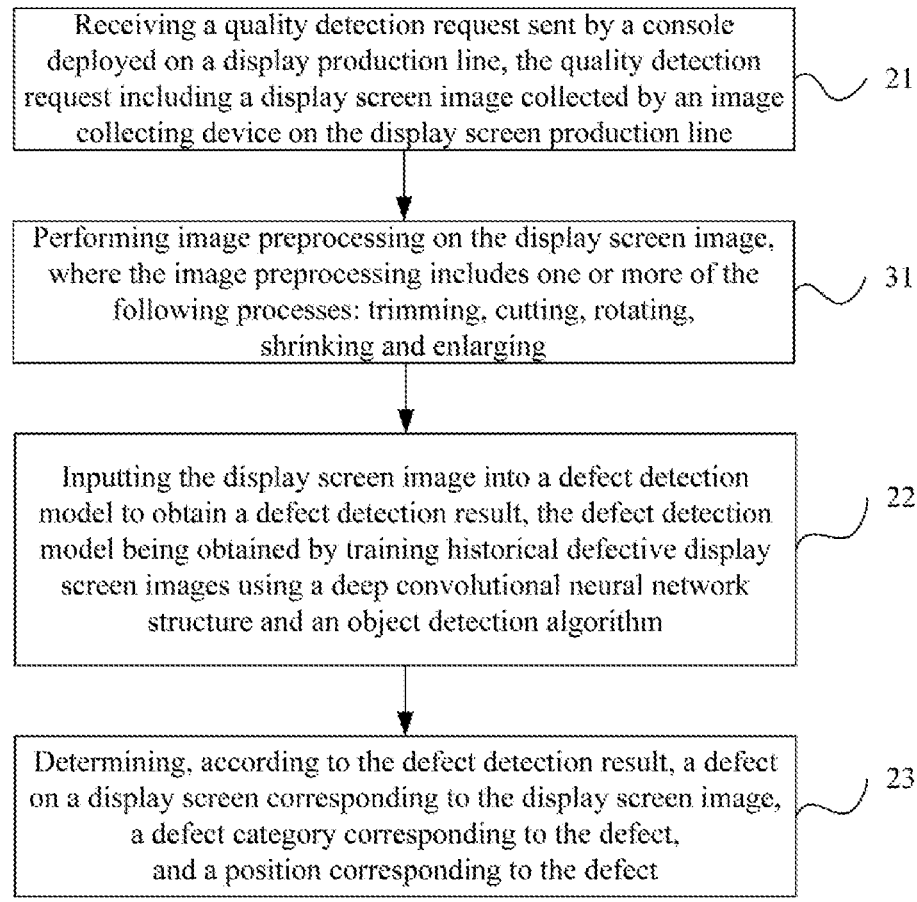
FIG. 4 is a flowchart of Embodiment 3 of a method for detecting display screen quality provided by an embodiment of the present application.

Optionally, FIG. 4 is a flowchart of Embodiment 3 of a method for detecting display screen quality provided by an embodiment of the present application. This embodiment of the present application is a further description of the method for detecting display screen quality based on the embodiment shown in FIG. 2. As shown in FIG. 4, the method for detecting display screen quality provided by this embodiment can also include the following step before the step 22 above (inputting the display screen image into the defect detection model to obtain the defect detection result):

Step 31: performing image preprocessing on the display screen image, where the image preprocessing includes one or more of the following processes: trimming, cutting, rotating, shrinking and enlarging.

Optionally, in the embodiments of the present application, the image collecting device deployed on the display screen production line is usually a high-precision camera, so the display screen image captured by the image collecting device may be large in size, high in pixels, or inappropriate in position, etc. Therefore, after receiving the display screen image included in the quality detection request sent by the console, it is necessary to preprocess the display screen image according to the actual situation.

For example, if the edge region of the display screen image is relatively large, then the display screen image can be trimmed to retain the useful part of the display screen image, or if the size of the display screen image is relatively large, then the display screen image can be cut and shrunk, so that the display screen image sent into the defect detection model can be completely detected and the prominence detection precision of the display screen can be improved. Or, if it is necessary to focus on detecting a certain region in the display screen image, then the region in the display screen image can be processed, such as being enlarged to make the preprocessed display screen image conform to the detection standard.

The method for detecting display screen quality in the embodiments of the present application can make the display screen image sent to the defect detection model conform to the detection standard by preprocessing, such as trimming, or/and cutting, or/and rotating, or/and shrinking, or/and enlarging the display screen image before inputting the display screen image into the defect detection model to obtain the defect detection result, which lays the foundation for the subsequent defect detection in the display screen image and improves the detection accuracy of the display screen quality.

Figure 5:
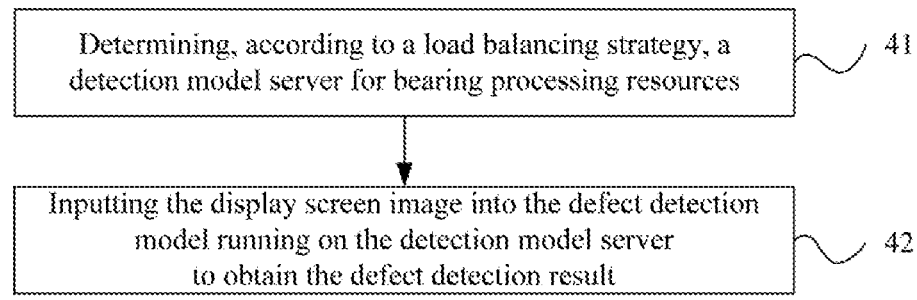
FIG. 5 is a flowchart of Embodiment 3 of a method for detecting display screen quality provided by an embodiment of the present application.

Optionally, based on the above embodiments, FIG. 5 is a flowchart of Embodiment 3 of a method for detecting display screen quality provided by an embodiment of the present application. As shown in FIG. 5, in this embodiment, the above step 22 (inputting the display screen image into the defect detection model to obtain the defect detection result) can be implemented by the following steps.

Step 41: determining, according to a load balancing strategy, a detection model server for bearing processing resources.

Optionally, in the embodiments of the present application, one server group is deployed on the display screen production line, and the number of servers in the server group can be multiple, with a defect detection model running on each server. Optionally, each server runs the same defect detection model, so each server can receive the quality detection request sent by the console, and then can use the defect detection model borne by itself to detect the quality with the display screen image.

As an example, the console can also send the quality detection request to any server of the server group in real time, because the image collecting device deployed on the display screen production line collects the display screen image in real time.

Optionally, because each server of the server group runs the same defect detection model, in order to improve the detection efficiency of the defect detection model on the server and ensure the load balance of the defect detection model, one detection model server for bearing processing resources can be determined from the server group according to the preset load balancing strategy, that is, load balancing and scheduling can be carried out in real time according to the deployment of the defect detection models on the display screen production line.

Step 42: inputting the display screen image into the defect detection model running on the detection model server to obtain the defect detection result.

Optionally, in the embodiments of the application, when a detection model server for bearing processing resources is determined from the server group, the display screen image above can be inputted into the defect detection model running on the detection model server, and the defect detection model can be used to detect the defect of the display screen image and then to obtain the defect detection result. Optionally, the defect detection model is obtained by training the historical defective display screen images by a training module using the structure of deep convolutional neural networks and the object detection algorithm.

The method for detecting display screen quality provided by the embodiments of the present application can realize the load balance on the server, improve the detection efficiency of the display screen image, and improve the performance of the system for detecting display screen quality, by determining, according to the load balancing strategy, the detection model server for bearing processing resources and inputting the display screen image into the defect detection model running on the above-mentioned detection model server to obtain the defect detection result.

Optionally, in the method for detecting display screen quality provided by the embodiments of the present application, the following steps can also be included after the above step 23 (determining, according to the defect detection result, the quality of the display screen corresponding to the display screen image):

if it is determined that the display screen is a defective display screen, performing one or more of the following operations:

sending, through the controller, alarm information to a production manager;

storing, through the controller, the defect detection result into the production database as a log;

sending, through the controller, a production control instruction to the console to eliminate the defect;

inputting the display screen image and the defect detection result into the defect detection model to optimize the above defect detection model.

Optionally, in the embodiments of the present application, a tester can preset a solution used when the display screen is determined to be a defective display screen according to the production scenario and production stage information of the display screen, such as sending alarm information to the production manager through the controller, and/or storing the defect detection result as a log into the production database through the controller, and/or sending the production control instruction to the console through the controller to eliminate the defect, and/or inputting the display screen image and the defect detection result into the above defect detection model to optimize the defect detection model, etc.

Specifically, as an example, when the display screen corresponding to the display screen image is determined to be a defective display screen according to the defect detection result, that is, when there is a defect in the display screen, alarm information can be sent to enable the production manager to locate the category and position of the defect in time, and give a solution.

As another example, when a defect is determined to exist in the display screen according to the defect detection result above, the defect detection result can be stored as a log into the production database through the controller, that is, the defect category of the display screen, and/or the defect instance, and/or the defect position can be stored as logs into the production database, and then be filtered into the training database, for the training module (which can be a training engine or other software program) to update the defect detection model according to the defective display screen image.

As another example, when a defect is determined to exist in the display screen according to the defect detection result above, a production control instruction can also be sent to the console through the controller to eliminate the defect. That is, the detection model server for bearing the defect detection model can determine the cause of the defect through the controller, and then adjust the production process accordingly. That is, the detection model server sends the production control instruction to the console through the controller to eliminate the defect on the display screens, so as to reduce the probability of the occurrence of the defective display screen; or, when a defect is determined to exist in the display screen according to the defect detection result above, an instruction can also be sent to a service response device through the controller to reduce the outflow of the defective display screen, such as, sending a grab instruction to a robot arm through the controller to grab the defective display screen.

As another example, when a defect is determined to exist in the display screen according to the defect detection result above, the above-mentioned display screen image and the above-mentioned defect detection result can also be inputted directly into the defect detection model to optimize the defect detection model. That is, the display screen image corresponding to the defective display screen is directly taken as the input of the defect detection model, and the defect detection result of the defective display screen is taken as the output of the defect detection model to optimize the defect detection model, thereby improving the detection accuracy of the defect detection model.

It is worth noting that the embodiments of the present application are not limited to the above one or more of the operations that can be performed by the detection model server when the display screen is determined to be the defective display screen, but can be determined according to the actual situation, which will not be repeated here.

Optionally, for the image collecting device, the console, the server group, the controller, the database and many other different devices deployed on the display screen production line, the operation steps corresponding to the method for detecting display screen quality can also be dispersed to the above-mentioned multiple different devices for execution. For example, the image collecting device collects a display screen image, and the console sends the display screen image collected by the image collecting device to the detection model server of the server group according to the load balancing strategy; the defect detection model running on the detection model server preprocesses the display screen image and then performs the defect detection, and gives a defect detection result. The detection model server can send the defect detection result to the controller which on one hand, makes a response that meets the requirement of an actual service scenario according to the defect detection result in combination with the actual service scenario and service needs, such as giving alarm, storing logs, controlling production control instructions, etc., on the other hand, can also store the defect detection result and the responsive processing behavior above as logs into the production database so that the training module updates the obtained defect detection model above according to the display screen image and the defect detection result in the training database, where the training database stores the defective display screen images screened from the production database and the corresponding defect detection results, etc.

It is worth noting that each optimized defect detection model can replace the defect detection model running on the server gradually by means of popping up online with small traffic, so as to achieve the purpose of dynamic expansion and generalization of the defect detection model with service scenarios and production stage information. When the method for detecting display screen quality in the embodiments of the present application has run on the display screen production line for a period of time, the accuracy of the above-mentioned defect detection and the defect location can be rechecked artificially through the information in the production database, and then the training database can be updated, and the defect detection model can be retrained to improve the accuracy of defect detection.

The following are apparatus embodiments of the present application, which can be used to execute the method embodiments of the present application. For the details not disclosed in the apparatus embodiments of the present application, please refer to the method embodiments of the present application.

Figure 6:
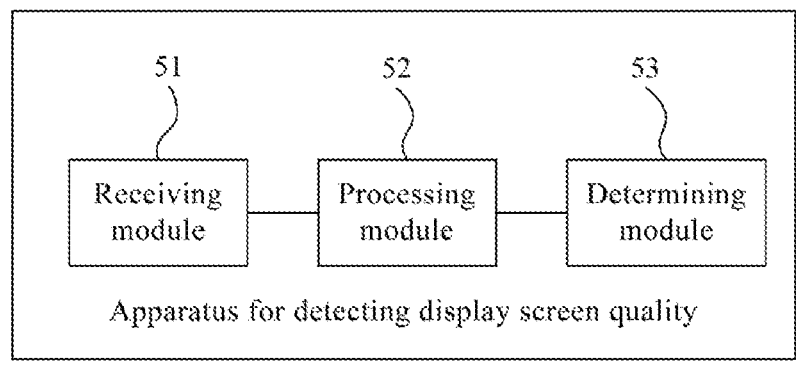
FIG. 6 is a schematic structural diagram 1 of an apparatus embodiment for detecting display screen quality provided by an embodiment of the present application.

FIG. 6 is a schematic structural diagram 1 of an apparatus embodiment for detecting display screen quality provided by an embodiment of the present application. As shown in FIG. 6, the apparatus for detecting display screen quality provided by the embodiments of the present application can include a receiving module 51, a processing module 52 and a determining module 53.

The receiving module 51 is configured to receive a quality detection request sent by a console deployed on a display screen production line, the quality detection request including a display screen image collected by an image collecting device on the display screen production line.

The processing module 52 is configured to input the display screen image into a defect detection model to obtain a defect detection result, the defect detection model being obtained by training historical defective display screen images using a structure of deep convolutional neural networks and an object detection algorithm.

The determining module 53 is configured to determine, according to the defect detection result, a defect on a display screen corresponding to the display screen image, a defect category corresponding to the defect, and a position corresponding to the defect.

Optionally, the defect detection model being obtained by training the historical defective display screen images using the structure of deep convolutional neural networks and the object detection algorithm includes that:

the defect detection model is a result of combined training on a candidate region loss, a region category loss and a region boundary loss of each of the historical defective display screen images, so that a total loss value of the candidate region loss, the region category loss and the region boundary loss satisfies a preset loss threshold;

where the candidate region loss refers to a loss value between a selected defective region in the each of the historical defective display screen images and an actual defective region, the region category loss refers to a loss value between a predicted defect category in the selected defective region and an actual defect category, and the region boundary loss refers to a loss between a predicted defect boundary in the selected defective region and an actual defect boundary.

Optionally, in a possible implementation of the present application, the processing module 52 is further configured to perform image preprocessing on the display screen image before inputting the display screen image into the defect detection model to obtain the defect detection result.

The image preprocessing includes one or more of the following processes:

trimming, cutting, rotating, shrinking and enlarging.

Optionally, in another possible implementation of the present application, the processing module 52 is specifically configured to determine, according to a load balancing strategy, a detection model server for bearing processing resources, and input the display screen image into the defect detection model running on the detection model server to obtain the defect detection result.

Optionally, in still another possible implementation of the present application, the determining module 53 is further configured to determine quality of the display screen corresponding to the display screen image according to production stage information and the defect detection result; the production stage information is used to indicate a manufacturer corresponding to the display screen, a production environment corresponding to the display screen, and a type of the display screen.

Optionally, in yet another possible implementation of the present application, the processing module 52 is further configured to perform one or more of the following operations if it is determined that the display screen is a defective display screen after the determining module 53 determines the quality of the display screen corresponding to the display screen image according to the defect detection result:

sending, through a controller, alarm information to a production manager;

storing, through the controller, the defect detection result into a production database as a log;

sending, through the controller, a production control instruction to the console to eliminate the defect;

inputting the display screen image and the defect detection result into the defect detection model to optimize the defect detection model.

The apparatus for detecting display screen quality of this embodiment can be used to execute the implementations of the method embodiments shown in FIG. 2 to FIG. 5. The specific implementations and the technical effects are similar, which will not be repeated here.

Figure 7:
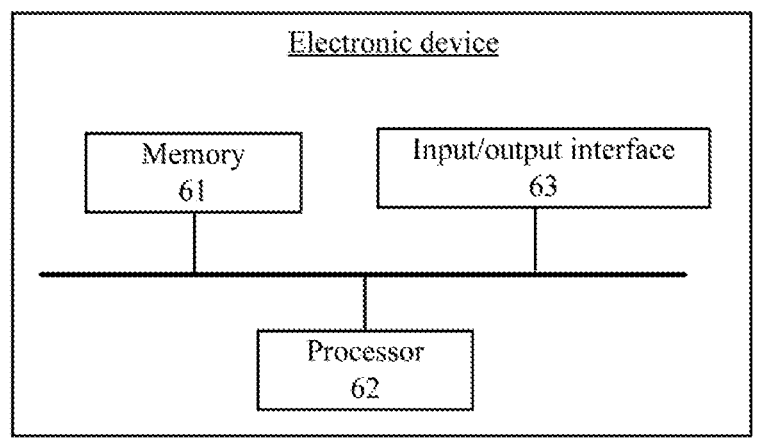
FIG. 7 is a schematic structural diagram 2 of an apparatus embodiment for detecting display screen quality provided by an embodiment of the present application.

FIG. 7 is a schematic structural diagram 2 of an apparatus embodiment for detecting display screen quality provided by an embodiment of the present application. As shown in FIG. 7, the apparatus for detecting display screen quality can be an electronic device, which can include a memory 61 and at least one processor 62.

The memory 61 is configured to store program instructions.

The processor 62 is configured to implement various steps of the method for detecting display screen quality illustrated in the method embodiments shown in FIG. 2 to FIG. 5 when the program instructions are executed. Reference for the specific implementations can be made to the above embodiments, which will not be repeated in this embodiment.

The electronic device can also include an input/output interface 63.

The input/output interface 63 can include independent output interface and input interface, and can also be an integrated interface in which the input and output are integrated. The output interface is configured to output data, and the input interface is configured to obtain input data. The output data is the collective name of the output in the above method embodiments, and the input data is the collective name of the input in the above method embodiments.

The present application also provides a storage medium, having instructions stored thereon, which, when running on a computer, cause the computer to execute the method in the method embodiments shown in FIG. 2 to FIG. 5.

The present application also provides a program product including a computer program stored on a storage medium. At least one processor of the apparatus for detecting display screen quality can read the computer program from the storage medium, and at least one processor executes the computer program so that the apparatus for detecting display screen quality executes the method in the method embodiments shown in FIG. 2 to FIG. 5.

It is understandable to those skilled in the art that all or part of the steps to implement the above-mentioned method embodiments can be accomplished by hardware related to program instructions. The aforementioned program can be stored in a computer readable storage medium. When the program is executed, steps including the embodiments of the above-mentioned methods are executed. The aforementioned storage medium includes various mediums capable of storing program codes, such as: a ROM, a RAM, a diskette or an optical disc.

What mentioned above is only the specific implementations of the present application, and the protection scope of the present application is not limited thereto. Changes or substitutions that can be easily thought of by those skilled in the art within the technical scope disclosed by the present application should all be covered within the protection scope of the present application. Therefore, the protection scope of the present application shall be subject to the protection scope of the claims.

What is claimed is:

1. A method for detecting display screen quality, comprising:
receiving a quality detection request sent by a console deployed on a display screen production line, the quality detection request comprising a display screen image collected by an image collecting device on the display screen production line;
inputting the display screen image into a defect detection model to obtain a defect detection result, the defect detection model being obtained by training historical defective display screen images using a structure of deep convolutional neural networks and an object detection algorithm; and
determining, according to the defect detection result, a defect on a display screen corresponding to the display screen image, a defect category corresponding to the defect, and a position corresponding to the defect;
wherein, the defect detection model is a result of combined training on a candidate region loss, a region category loss and a region boundary loss of each of the historical defective display screen images, so that a total loss value of the candidate region loss, the region category loss and the region boundary loss satisfies a preset loss threshold.

2. The method according to claim 1,
wherein the candidate region loss refers to a loss value between a selected defective region in the each of the historical defective display screen images and an actual defective region, the region category loss refers to a loss value between a predicted defect category in the selected defective region and an actual defect category, and the region boundary loss refers to a loss value between a predicted defect boundary in the selected defective region and an actual defect boundary.

3. The method according to claim 1, before inputting the display screen image into a defect detection model to obtain a defect detection result, further comprising:
performing image preprocessing on the display screen image, wherein the image preprocessing comprises one or more of the following processes:
trimming, cutting, rotating, shrinking and enlarging.

4. The method according to claim 1, wherein the inputting the display screen image into a defect detection model to obtain a defect detection result comprises:
determining, according to a load balancing strategy, a detection model server for bearing processing resources; and
inputting the display screen image into the defect detection model running on the detection model server to obtain the defect detection result.

5. The method according to claim 1, further comprising:
determining quality of the display screen corresponding to the display screen image according to production stage information and the defect detection result; the production stage information is used to indicate a manufacturer corresponding to the display screen, a production environment corresponding to the display screen, and a type of the display screen.

6. The method according to claim 5, after determining quality of the display screen corresponding to the display screen image according to production stage information and the defect detection result, further comprising:
if it is determined that the display screen is a defective display screen, performing one or more of the following operations:
sending, through a controller, alarm information to a production manager;
storing, through the controller, the defect detection result into a production database as a log;
sending, through the controller, a production control instruction to the console to eliminate the defect;
inputting the display screen image and the defect detection result into the defect detection model to optimize the defect detection model.

7. An electronic device, comprising: at least one processor and a memory;
the memory is configured to store computer execution instructions;
when executing the computer execution instructions stored on the memory, the at least one processor is configured to:
receive a quality detection request sent by a console deployed on a display screen production line, the quality detection request comprising a display screen image collected by an image collecting device on the display screen production line;
input the display screen image into a defect detection model to obtain a defect detection result, the defect detection model being obtained by training historical defective display screen images using a structure of deep convolutional neural networks and an object detection algorithm; and determine, according to the defect detection result, a defect on a display screen corresponding to the display screen image, a defect category corresponding to the defect, and a position corresponding to the defect;

wherein, the defect detection model is a result of combined training on a candidate region loss, a region category loss and a region boundary loss of each of the historical defective display screen images, so that a total loss value of the candidate region loss, the region category loss and the region boundary loss satisfies a preset loss threshold.

8. The electronic device according to claim 7, wherein, the candidate region loss refers to a loss value between a selected defective region in the each of the historical defective display screen images and an actual defective region, the region category loss refers to a loss value between a predicted defect category in the selected defective region and an actual defect category, and the region boundary loss refers to a loss value between a predicted defect boundary in the selected defective region and an actual defect boundary.

9. The electronic device according to claim 7, wherein, the at least one processor is further configured to perform image preprocessing on the display screen image before inputting the display screen image into the defect detection model to obtain the defect detection result;

wherein the image preprocessing comprises one or more of the following processes:

trimming, cutting, rotating, shrinking and enlarging.

10. The electronic device according to claim 7, wherein, the at least one processor is specifically configured to determine, according to a load balancing strategy, a detection model server for bearing processing resources, and input the display screen image into the defect detection model running on the detection model server to obtain the defect detection result.

11. The electronic device according to claim 7, wherein the at least one processor is further configured to determine quality of the display screen corresponding to the display screen image according to production stage information and the defect detection result; the production stage information is used to indicate a manufacturer corresponding to the display screen, a production environment corresponding to the display screen, and a type of the display screen.

12. The electronic device according to claim 11, wherein, the at least one processor is further configured to: after determining the quality of the display screen corresponding to the display screen image according to the defect detection result, if it is determined that the display screen is a defective display screen, perform one or more of the following operations:

sending, through a controller, alarm information to a production manager;

storing, through the controller, the defect detection result into a production database as a log;

sending, through the controller, a production control instruction to the console to eliminate the defect;

inputting the display screen image and the defect detection result into the defect detection model to optimize the defect detection model.

13. A storage medium, having computer execution instructions stored thereon which, when executed by a processor, implement operations comprising:

receiving a quality detection request sent by a console deployed on a display screen production line, the quality detection request comprising a display screen image collected by an image collecting device on the display screen production line;

inputting the display screen image into a defect detection model to obtain a defect detection result, the defect detection model being obtained by training historical defective display screen images using a structure of deep convolutional neural networks and an object detection algorithm; and determining, according to the defect detection result, a defect on a display screen corresponding to the display screen image, a defect category corresponding to the defect, and a position corresponding to the defect;

wherein, the defect detection model is a result of combined training on a candidate region loss, a region category loss and a region boundary loss of each of the historical defective display screen images, so that a total loss value of the candidate region loss, the region category loss and the region boundary loss satisfies a preset loss threshold.

14. The storage medium according to claim 13, wherein the candidate region loss refers to a loss value between a selected defective region in the each of the historical defective display screen images and an actual defective region, the region category loss refers to a loss value between a predicted defect category in the selected defective region and an actual defect category, and the region boundary loss refers to a loss value between a predicted defect boundary in the selected defective region and an actual defect boundary.

15. The storage medium according to claim 13, wherein the operations further comprise:

performing image preprocessing on the display screen image before inputting the display screen image into the defect detection model to obtain the defect detection result, wherein the image preprocessing comprises one or more of the following processes:

trimming, cutting, rotating, shrinking and enlarging.

16. The storage medium according to claim 13, wherein the operations further comprise:

determining, according to a load balancing strategy, a detection model server for bearing processing resources; and inputting the display screen image into the defect detection model running on the detection model server to obtain the defect detection result.

17. The storage medium according to claim 13, wherein the operations further comprise:

determining quality of the display screen corresponding to the display screen image according to production stage information and the defect detection result; the production stage information is used to indicate a manufacturer corresponding to the display screen, a production environment corresponding to the display screen, and a type of the display screen.

18. The storage medium according to claim 17, wherein the operations further comprise:

after determining quality of the display screen corresponding to the display screen image according to production stage information and the defect detection result, if it is determined that the display screen is a defective display screen, performing one or more of the following operations:

sending, through a controller, alarm information to a production manager;

storing, through the controller, the defect detection result into a production database as a log;

sending, through the controller, a production control instruction to the console to eliminate the defect;

inputting the display screen image and the defect detection result into the defect detection model to optimize the defect detection model.

\* \* \* \* \*